US009502763B2

(12) United States Patent
Jo et al.

(10) Patent No.: US 9,502,763 B2
(45) Date of Patent: Nov. 22, 2016

(54) STABILIZATION SYSTEM FOR SATELLITE TRACKING ANTENNA USING GYRO AND KALMAN FILTER AND STABILIZATION CONTROL METHOD FOR SATELLITE TRACKING ANTENNA

(71) Applicants: Si Hun Jo, Daejeon (KR); Ho Jung Lee, Daejeon (KR); Byoung Uk Nam, Daejeon (KR); Jong Wan Heo, Daejeon (KR)

(72) Inventors: Si Hun Jo, Daejeon (KR); Ho Jung Lee, Daejeon (KR); Byoung Uk Nam, Daejeon (KR); Jong Wan Heo, Daejeon (KR)

(73) Assignee: AGENCY FOR DEFENSE DEVELOPMENT (KR)

( * ) Notice: Subject to any disclaimer, the term of this patent is extended or adjusted under 35 U.S.C. 154(b) by 641 days.

(21) Appl. No.: 14/257,258

(22) Filed: Apr. 21, 2014

(65) Prior Publication Data

US 2015/0116152 A1 Apr. 30, 2015

(30) Foreign Application Priority Data

Oct. 25, 2013 (KR) ........................ 10-2013-0127954

(51) Int. Cl.
*H01Q 3/00* (2006.01)
*G01S 13/00* (2006.01)
*H01Q 3/08* (2006.01)

(52) U.S. Cl.
CPC ....................................... *H01Q 3/08* (2013.01)

(58) Field of Classification Search
USPC ............ 342/77, 80, 359, 420, 422; 343/754, 343/757
See application file for complete search history.

(56) References Cited

U.S. PATENT DOCUMENTS 5,052,637 A * 10/1991 Lipps .................... F41G 7/2213 244/3.15
6,433,736 B1 * 8/2002 Timothy .................. H01Q 1/18 342/359
2008/0120031 A1 * 5/2008 Rosenfeld ............ G01C 21/165 701/500

FOREIGN PATENT DOCUMENTS

KR 10-1041850 6/2011

OTHER PUBLICATIONS

Office Action issued by Korean Patent Office on Oct. 30, 2014 in connection with corresponding Korean Application No. 10-2013-0127954 with Japanese and English Translation thereof.
Ha Young Jung, et al., '*LOS Determinaton Using Ins for an Aircraft Mounted Satellite Tracking'Antenna*; Dept. of Electronics Engineering, Chungnam Nat'l University; Apr. 30, 2012; pp. 184-190.

* cited by examiner

*Primary Examiner* — Dao Phan
(74) *Attorney, Agent, or Firm* — Ostrolenk Faber LLP

(57) ABSTRACT

A stabilization control method for a satellite tracking antenna disclosed herein includes outputting a monopulse signal and a gyro signal through a satellite tracking antenna having a gyro mounted thereto, under a situation that disturbance is applied to the satellite tracking antenna, inputting the output monopulse signal and gyro signal into a Kalman filter for stabilization of the satellite tracking antenna, defining a state vector of the Kalman filter based on a pointing-error angle for the satellite tracking, corresponding to the monopulse signal, and a pointing-error angular velocity for the satellite tracking, corresponding to the gyro signal, predicting an original monopulse signal corresponding to a state prior to distortion of the monopulse signal based on the defined state vector, and continuously updating the prediction of the original monopulse signal, and carrying out the stabilization control for the satellite tracking antenna by using the predicted original monopulse signal as a pointing-error-correcting input value.

6 Claims, 6 Drawing Sheets

STABILIZATION SYSTEM FOR SATELLITE TRACKING ANTENNA USING GYRO AND KALMAN FILTER AND STABILIZATION CONTROL METHOD FOR SATELLITE TRACKING ANTENNA

CROSS-REFERENCE TO RELATED APPLICATION

Pursuant to 35 U.S.C. §119(a), this application claims the benefit of earlier filing date and right of priority to Korean Application No. 10-2013-0127954, filed on Oct. 25, 2013, the contents of which is incorporated by reference herein in its entirety.

BACKGROUND OF THE DISCLOSURE

1. Field of the Disclosure

This specification relates to a stabilization system for a satellite tracking antenna using a gyro and a Kalman filter, and a stabilization control method for the satellite tracking antenna.

2. Background of the Disclosure

A satellite-directing antenna or a satellite tracking antenna refers to an antenna which is used to communicate with an artificial satellite, which is located in the earth's orbit. The satellite tracking antenna is diversified in type, according to structure, purpose of use, functionality and the like.

The most widely known satellite tracking antenna is a civilian model satellite antenna which is generally installed in home or in a vehicle to be used for receiving broadcasts. A household satellite-directing antenna is fixed to direct the satellite. Such antenna does not require a separate manipulation after its initial installation. On the other hand, when an antenna, such as a vehicle-mounted satellite tracking antenna, is installed in a mobile (movable, moving) object (or vehicle), the antenna should continuously direct the satellite during movement of the moving vehicle. Hence, there is a requirement for an algorithm using a separate driving device for the antenna to direct the satellite with overcoming disturbance applied to the antenna. However, since even the vehicle-mounted satellite tracking antenna generally uses electric waves for receiving broadcasts with a relatively wide beam-width, it does not have to accurately track the satellite.

In the meantime, a communication network is very important for a military satellite antenna. The military satellite antenna has differences from the civilian model antenna, in the aspects of an operation environment, a used frequency, a required accuracy, and the like, depending on changes in environments of battlefields. More concretely, the military satellite antenna, which is mounted to a is military mobile device, suffers from severe disturbance and a narrow beam-width of a used frequency, and accordingly requires very high satellite tracking accuracy. Hence, in order to continue communication by allowing the military satellite antenna to keep tracking the satellite even in such operation condition, a stabilization control for the satellite tracking antenna is very important.

As a stabilization control method of the satellite tracking antenna, an algorithm using a posture of a platform, a sensor for measuring disturbance, and a beacon signal is the most widely used.

The stabilization control algorithm decides a satellite tracking direction by determining a posture of a platform. Here, it is difficult to accurately track the satellite due to the affection of a performance of a sensor, a mechanical characteristic, and the like. Accordingly, the satellite is tracked in such a manner of scanning a point with the highest strength of a beacon signal sent from the satellite. Afterwards, a control command for stabilizing the antenna is generated by measuring disturbance, which is applied to the antenna due to the platform being driven. In addition, a process of continuously tracking the satellite by detecting the point with the highest strength of the beacon signal in a continuous manner is used.

However, this algorithm has a difficulty in ensuring a stabilization control performance, due to accuracy of a disturbance measuring sensor, a mechanical characteristic of a pedestal of the antenna, noise of the beacon signal, a time delay, and the like.

To overcome those disadvantage, a stabilization control method using a monopulse satellite tracking antenna, which allows a pointing-error to be generated directly from a reference signal, which is sent from the satellite, is irrespective of the accuracy of the disturbance measuring sensor, is actively researched.

In the stabilization control method using a monopulse signal, in which a satellite pointing-error is output without using a sensor-measured value, after initially directing the satellite, the disturbance/posture measuring sensor and the pedestal characteristic do not affect the accuracy of the stabilization control. However, in many cases, the monopulse signal itself has already been distorted due to noise, a time delay, and the like. Specifically, when a monopulse antenna is applied to satellite communication, through which a reference signal of a weak strength is received, noise is also amplified while amplifying the signal, and a time delay is accordingly caused while processing the signal. Further, such problems become worse when a reflector of the satellite tracking antenna is designed to be small in size.

SUMMARY OF THE DISCLOSURE

Therefore, to overcome those drawbacks of the related art, an aspect of the detailed description is to provide a stabilization system for a satellite tracking antenna using a gyro and a Kalman filter, capable of predicting a monopulse signal prior to distortion, in such a manner of removing the distortion, such as noise contained in the monopulse signal and a time delay thereof in the satellite tracking antenna, and compensating for (correcting) the monopulse signal using a gyro, which is added to a rear part of the satellite antenna reflector, and a Kalman filter, and a stabilization control method for the satellite tracking antenna.

To achieve these and other advantages and in accordance with the is purpose of this specification, as embodied and broadly described herein, there is provided a stabilization control method for a satellite tracking antenna, the method including outputting a monopulse signal and a gyro signal through a satellite tracking antenna having a gyro mounted thereto, under a situation that disturbance is applied to the satellite tracking antenna, inputting the output monopulse signal and gyro signal into a Kalman filter for stabilization of the satellite tracking antenna, defining a state vector of the Kalman filter based on a pointing error angle for the satellite tracking, corresponding to the monopulse signal, and a pointing error angular velocity for the satellite tracking, corresponding to the gyro signal, predicting an original monopulse signal corresponding to a state prior to distortion of the monopulse signal based on the defined state vector, and continuously updating the prediction of the original monopulse signal, and carrying out the stabilization control for the satellite tracking antenna by using the predicted original monopulse signal as a pointing-error-correcting command.

In accordance with one exemplary embodiment disclosed herein, the method may further include, after the updating step, applying an angular velocity value, measured by the gyro mounted to a load end, to an angular velocity value updated by the Kalman filter.

In accordance with one exemplary embodiment disclosed herein, the updating step may be executed to continuously update a Kalman gain of the Kalman filter and the prediction of the original monopulse signal, using the monopulse signal measured through the satellite tracking antenna.

In accordance with one exemplary embodiment disclosed herein, the predicting step and the updating step of the original monopulse signal may be repetitively carried out until a data input into the Kalman filter is ended.

In accordance with one exemplary embodiment disclosed herein, the inputting into the Kalman filter may be executed to input the monopulse signal and the measured gyro angular velocity to the Kalman filter.

To achieve these and other advantages and in accordance with the purpose of this specification, as embodied and broadly described herein, there is provided a stabilization system for a satellite tracking antenna, the system including a satellite tracking antenna, a gyro module that is connected to a rear end of a reflector of the satellite tracking antenna and configured to sense a gyro signal for calculating a pointing error angular velocity for a satellite directed by the satellite tracking antenna, a Kalman filter unit that is configured to calculate a prediction of an original monopulse signal, corresponding to a state prior to distortion of the monopulse signal, by using the monopulse signal and the sensed gyro signal as input signals, and a controller that is configured to carry out a stabilization control for the satellite tracking antenna by receiving the prediction of the original monopulse signal as a pointing-error-correcting command.

In accordance with one exemplary embodiment disclosed herein, the Kalman filter unit may include a state vector definition module that is configured to define a state vector based on a pointing error angle for the satellite tracking, corresponding to the monopulse signal, and a pointing error angular velocity for the satellite tracking, corresponding to the sensed gyro signal, an original signal prediction module that is configured to predict the original monopulse signal corresponding to the state prior to the distortion of the monopulse signal, based on the defined state vector, an update module that is configured to continuously update the prediction of the original monopulse signal, and after the update, apply the sensed gyro signal to a state variable, corresponding to an angular velocity of the updated monopulse signal, and an output module that is configured to output the predicted original monopulse signal to the controller.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Figure 1:
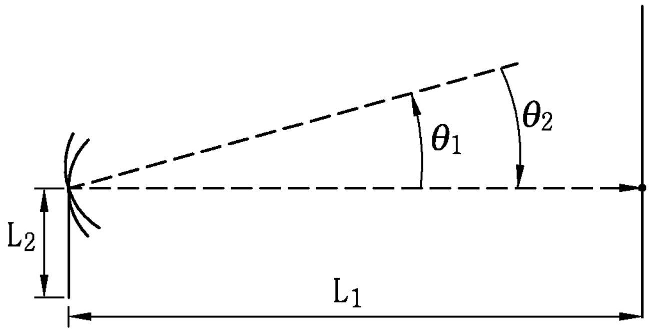
FIG. 1 is a view comparing a pointing-error angle obtained using a gyro with a pointing-error angle using a monopulse signal, when disturbance is applied to a driving shaft of a satellite tracking antenna in accordance with an exemplary embodiment of the present disclosure.

Description will now be given in detail of a stabilization system for a satellite tracking antenna using a gyro and a Kalman filter, and a stabilization control method for the satellite tracking antenna, according to the exemplary embodiments, with reference to the accompanying drawings.

In describing the present disclosure, if a detailed explanation for a related known function or construction is considered to unnecessarily divert the gist of the present disclosure, such explanation has been omitted but would be understood by those skilled in the art. Also, irrelevant parts from the description have been omitted to clearly explain the present disclosure, and similar reference numerals have been provided to similar elements throughout the specification.

When a satellite tracking antenna is mounted to a mobile platform to execute a function of maintaining the satellite tracking, there may be various methods of executing stabilization control by overcoming disturbance applied to the antenna. As one of those stabilization control methods, a stabilization control using a monopulse signal employs a concept of calculating a difference between a direction that the satellite tracking antenna currently directs the satellite and a direction that the antenna has to direct the satellite based on a reference signal (for example, a beacon signal) sent from the satellite, and then feedbacking the calculated difference to a controller. Therefore, upon the use of the monopulse signal, the control structure can be implemented more simply without depending on the performance of a sensor.

A monopulse signal is a noise-contained signal, which indicates an angle between a position which the satellite tracking antenna currently directs and a position which the satellite tracking antenna has to direct. Therefore, when the satellite tracking antenna precisely directs the satellite, the monopulse signal may be 0, and a separate driving operation for stabilizing the antenna may not be required. Afterwards, when the satellite tracking direction is changed due to disturbance and the like, a monopulse control input may be calculated by a changed direction of antenna, and used as a control input for the stabilization control.

On the other hand, in order to use the monopulse signal for calculation, the reference signal has to be provided in a clean state without noise. Hence, the monopulse signal is generally applied to a system which is capable of autonomously fully amplifying the reference signal. However, the satellite tracking antenna receives a signal with a limited strength from the satellite. This may cause the monopulse signal to contain a plenty of noise. Specifically, a signal-to-noise ratio (SNR) increases more when a reflector of the antenna is smaller in diameter.

When the SNR is small, if the monopulse signal is directly used as a control input, a noise frequency which exceeds a control bandwidth may cause an error in a system. According to such reason, the monopulse signal is generally processed to pass through a low frequency pass filter to remove noise therefrom. This method allows for obtaining a clean signal, but a problem of a time delay may become worse due to employing the low frequency pass filter upon calculating the monopulse signal Therefore, a stabilization control method for a satellite tracking antenna in accordance with an exemplary embodiment has been implemented to execute a stabilization control for the satellite tracking antenna, in such a manner of predicting an original monopulse signal, which is in a state prior to distortion, based on a gyro signal, measured by a gyro mounted to a load end and a monopulse signal, and using the predicted original monopulse signal as a pointing-error-correcting command for stabilization control.

Figure 6:
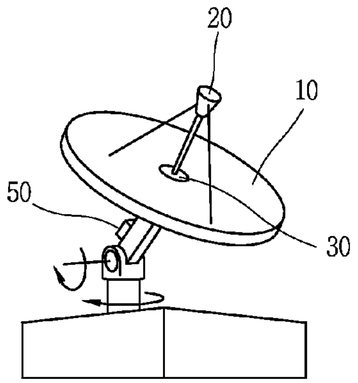
FIG. 6 is a view illustrating a schematic structure of a satellite tracking antenna having a load gyro mounted thereto, in accordance with an exemplary embodiment of the present disclosure.

To this end, the satellite tracking antenna according to the exemplary embodiment, as illustrated in FIG. 6, may have a structure having a load gyro mounted to a rear of the satellite tracking antenna reflector. FIG. 6 illustrates a schematic structure of the satellite tracking antenna with the load gyro mounted thereto, in accordance with the exemplary embodiment.

As illustrated in FIG. 6, the satellite tracking antenna according to the exemplary embodiment may include a main reflector 10, a sub reflector 20, a horn copier 30, and a gyro 50.

The main reflector 10 may have a cross section in a parabolic shape, and have a surface formed of a conductive material, such that incident electric waves are concentrated on a focal point for reflection or electric waves emitted from the focal point are reflected substantially in parallel. As the electronic waves are concentrated on the focal point by the main reflector 10, weak electric waves can be easily received, and reversely, the electric waves can be transferred up to a remote distance upon transmission.

The horn copier 30 is also called a feed horn, and is a type of antenna element for transmission and reception of electric waves. The horn copier 30 may carry out a signal processing by including a low noise amplifier, a power distributer, a high frequency phase shifter, a high frequency mixer, a down converter, and the like. Also, the horn copier 30 may carry out transmission and reception of electric waves for monopulse signals in various directions and transmission and reception of electric waves for data communication. The horn copier 30 may preferably have a plurality of openings (for example, 2×2) each having the same size for generating uniform monopulse signals.

The sub reflector 20 may be disposed at a side of the opening of the horn copier 30, to reflect electric waves from the horn copier 30 to the main reflector 10 or electric waves from the main reflector 10 to the horn copier 30.

The load gyro 50 may be connected to a rear end of the main reflector 10 of the satellite tracking antenna, to measure a gyro signal, which is generated due to disturbance applied to the satellite tracking antenna or in response to the antenna being driven.

In relation to a detailed operation of the load gyro 50, FIG. 1 illustrates a view comparing a pointing-error angle obtained using a gyro with a pointing-error angle using a monopulse signal, when disturbance is applied to a driving shaft of the satellite tracking antenna in accordance with the exemplary embodiment of the present disclosure.

In FIG. 1, $L_1$ denotes a distance from the satellite tracking antenna to a target, and $L_2$ denotes a distance from the satellite tracking antenna to a (mobile) platform. Also, $\theta_1$ denotes an integral angle of a gyro signal measured by the load gyro 50, and $\theta_2$ denotes an angle of a monopulse signal (namely, a pointing-error correction generation angle). As illustrated in FIG. 1, if it is assumed that a gyro drift does not occur, an angle inclined due to disturbance may be the same as the angle $\theta_1$, which is an angle obtained by integrating a gyro angular velocity. Therefore, a relationship may be established in such a manner that an angle $\theta_2$, which can be defined as a pointing-error correction angle according to movement of a load, is the same as $\theta_1$ in size and opposite to $\theta_1$ in direction.

Figure 2:
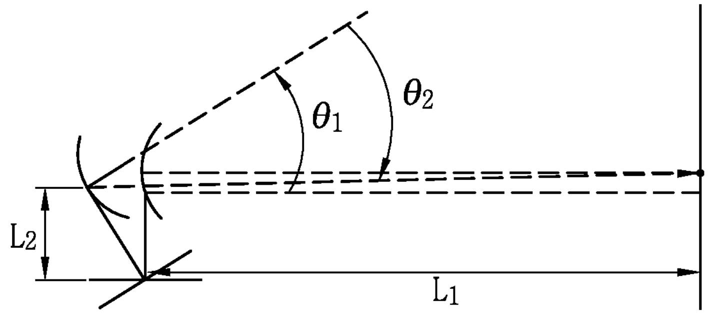
FIG. 2 is a view comparing a pointing-error angle obtained using a gyro with a pointing-error angle using a monopulse signal, when disturbance is applied to a platform of the satellite tracking antenna in accordance with the exemplary embodiment of the present disclosure.

FIG. 2 is a view comparing a tilting angle obtained using a gyro with a tilting angle using a monopulse signal, when disturbance is applied to the platform of the satellite tracking antenna in accordance with the exemplary embodiment of the present disclosure.

Under the situation illustrated in FIG. 2, since a distance between a driving shaft of the satellite tracking antenna and a target is changed due to the platform being inclined, $\theta_1$ and $\theta_2$ may have different sizes from each other, unlike the relationship illustrated in FIG. 1. Then, difference value thereof may be defined as $\theta_3=\theta_1\ \theta_2$. The definition may be expressed by Equation 1.

$$\theta_3 = \tan^{-1}\left(\frac{L_2 - L_2\cos(\theta_1)}{L_1 - L_2\sin(\theta_1)}\right) \quad \text{[Equation 1]}$$

Here, the $\theta_3$ may have a positive value when $\theta_1$ is inclined rearward. Also, when $L_2$ is fixed, $L_1$ generally has an influence on the $\theta_3$. That is, when the satellite tracking antenna is getting farther away from a target, the tilt-correcting value $\theta_3$ may become smaller. For example, when $L_2$=1 m, the change in the tilt-correcting value $\theta_3$ according to $L_1$ and the tilted angle of the platform is illustrated in FIG. 3.

Figure 3:
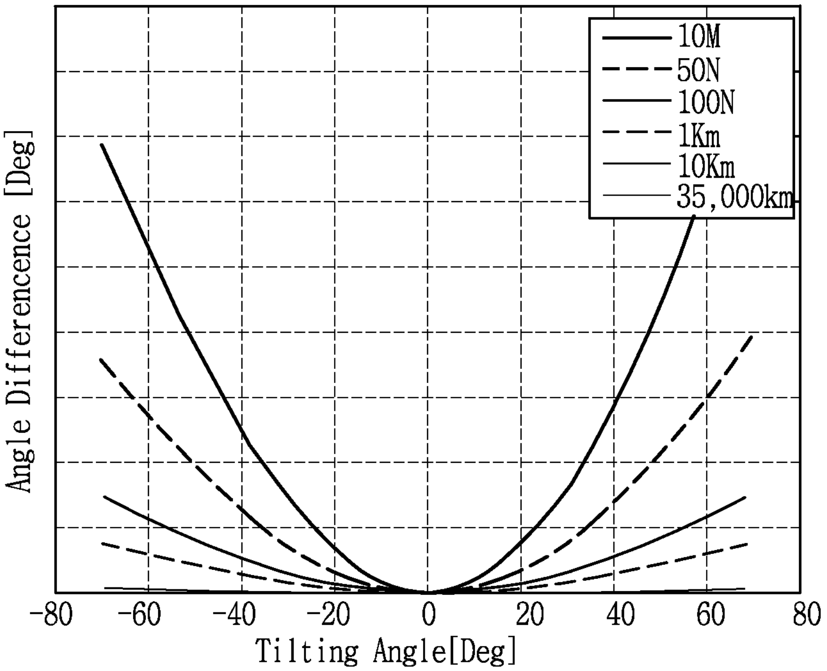
FIG. 3 is a view comparing a pointing-error angle obtained using a gyro with a pointing-error angle using a monopulse signal, corresponding to a change in a tilt of a platform and a distance between the antenna and a satellite, in the satellite tracking antenna in accordance with the exemplary embodiment of the present disclosure.

FIG. 3 is a view comparing a pointing-error angle obtained using a gyro with a pointing-error angle using a monopulse signal, according to a change in a tilt (or inclination) of a platform and a distance between the antenna and the satellite, in the satellite tracking antenna in accordance with the exemplary embodiment of the present disclosure.

As illustrated in FIG. 3, when $L_1$ is getting farther, a difference between the monopulse signal and the integration of the gyro signal may be reduced. Hence, if the satellite tracking antenna directs a stationary satellite, $L_1$ may be about 35,000 Km. Therefore, $\theta_3$ may be a value almost similar to '0,' and a relationship may be defined as $\theta_2$ and $\theta_1$ having the same size and different directions, similar to the situation illustrated in FIG. 1, even when the platform is moved.

Figure 4:
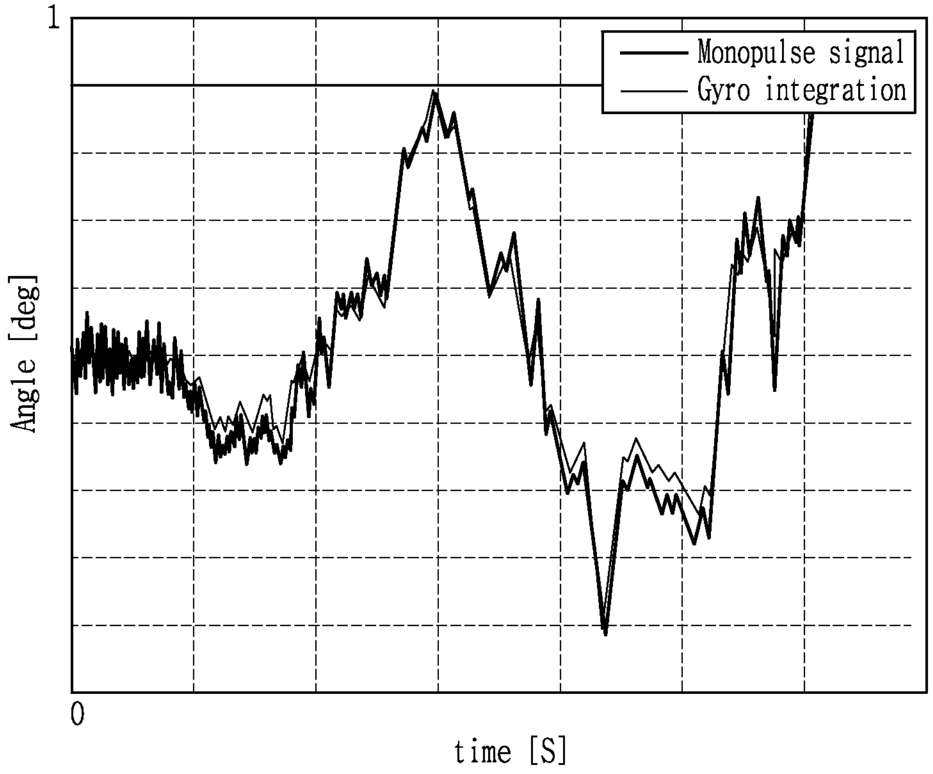
FIG. 4 is a view illustrating a measurement difference between a tilting angle obtained using a gyro and a tilting angle using a monopulse signal, according to a lapse of time, in the satellite tracking antenna in accordance with the exemplary embodiment of the present disclosure.

On the other hand, FIG. 4 is a view illustrating a measurement difference between a pointing-error angle obtained using a gyro and a pointing-error angle using a monopulse signal, according to a lapse of time, in the satellite tracking antenna in accordance with the exemplary embodiment of the present disclosure. As illustrated in FIG. 4, it can be seen that the monopulse signal and the integration of the gyro signal have a similar pattern. That is, if it is possible to accurately measure an angle that the load is moved in a global coordinate system, it can be concluded that the satellite tracking can be maintained without use of the monopulse signal (namely, by using the integration of the gyro signal).

However, taking into account a drift as one of physical characteristics which decide the performance of the load gyro, the integration of the gyro signal cannot be used as it is, instead of the monopulse signal. The gyro drift which is a characteristic with voluntariness is measured along with an angular velocity, noise and the like. However, due to the drift being small in size, the angular velocity which is measured at every moment may be reliable. However, when an integral angle of the angular velocity is obtained, deviation may also be integrated as a time elapses, the size of the drift may not be ignorable. Hence, the integration of the gyro signal may be equal to the monopulse signal at the beginning, but be getting more different from the monopulse signal as a time elapses. This characteristic can be seen in FIG. 4.

The monopulse signal may be modeled into a form in which noise is mixed with an original signal, if the characteristic, such as a time delay or non-linearity is excluded. Here, if it is assumed that noise is Gaussian noise with a specific normal distribution, it may be possible to predict an original signal of the monopulse signal by applying the Kalman filter according to an exemplary embodiment disclosed herein. To this end, the satellite tracking antenna according to the exemplary embodiment disclosed herein may have a structure in which the gyro 50 is mounted to a lower end of a rear surface of the main reflector 10, as illustrated in FIG. 6.

Figure 7:
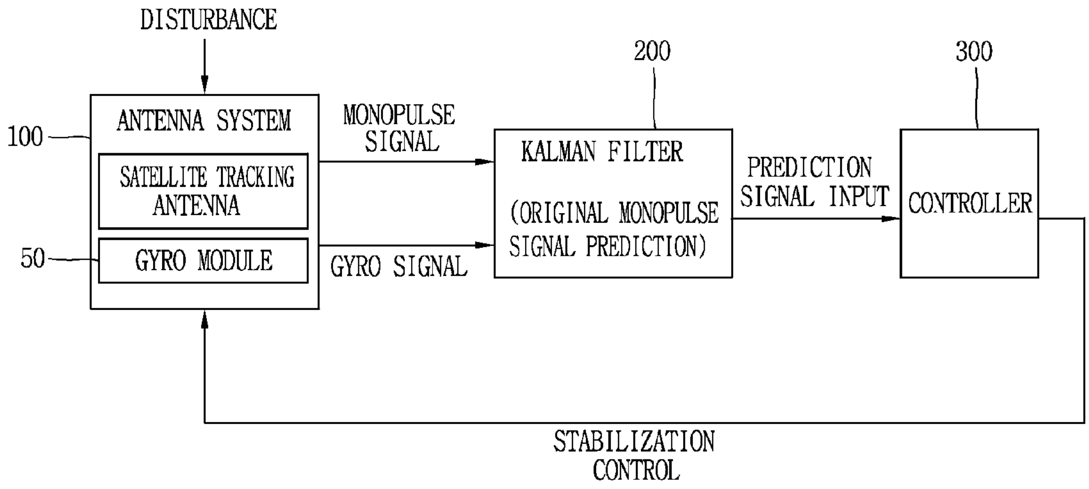
FIG. 7 is a block diagram illustrating a schematic structure of a stabilization system for a satellite tracking antenna in accordance with an exemplary embodiment of the present disclosure.

FIG. 7 is a block diagram illustrating a schematic structure of a stabilization system for a satellite tracking antenna in accordance with an exemplary embodiment of the present disclosure.

As illustrated in FIG. 7, a stabilization system for a satellite tracking antenna according to an exemplary embodiment of the present disclosure may include an antenna system 100, a Kalman filter 200, and a controller 300 for stabilization of the antenna system 100.

The antenna system 100 may include a satellite tracking antenna, and a gyro module 50.

Here, the satellite tracking antenna is an antenna element which tracks the satellite, and should have a structure, which is capable of outputting a monopulse signal, unlike a general satellite antenna. The gyro module 50 may be connected to a rear end of a reflector of the satellite tracking antenna to sense an angular velocity with respect to a satellite directed by the satellite tracking antenna. In turn, a monopulse signal and the sensed gyro signal may be output to the Kalman filter 200.

The Kalman filter 200 may calculate a predicted value (prediction) of an original monopulse signal, which corresponds to a state prior to distortion of the monopulse signal, by using the monopulse signal and the sensed gyro signal as input signals. Hereinafter, a detailed configuration and process for the Kalman filter 200 will be described in detail with reference to FIG. 8.

The controller 300 may receive the predicted value of the original monopulse signal, which has been input by the Kalman filter 200 as a pointing-error-correcting value. The controller 300 may then generate a control signal based on the received predicted value, and transfer the generated control signal to the antenna system 100, thereby carrying out the stabilization for the satellite tracking antenna. For example, the satellite tracking antenna may be rotated by an angle corresponding to the control signal, thereby changing a tracking direction.

Figure 8:
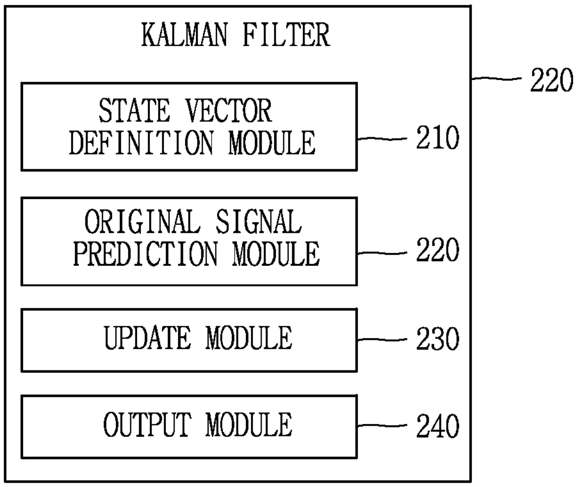
FIG. 8 is a block diagram illustrating a detailed structure of a Kalman filter in the stabilization system for the satellite tracking antenna in accordance with the exemplary embodiment of the present disclosure.

Meanwhile, FIG. 8 is a block diagram illustrating a detailed structure of a Kalman filter in the stabilization system for the satellite tracking antenna in accordance with the exemplary embodiment of the present disclosure, As illustrated in FIG. 8, the Kalman filter 200 may include a state vector definition module 210, an original signal prediction module 220, an update module 230, and an output module 240.

The state vector definition module 210 may define a state vector based upon a pointing error angle for the satellite tracking, corresponding to the monopulse signal, and a pointing error angular velocity for the satellite tracking, corresponding to the gyro signal sensed by the gyro module 50. That is, the state vector may be defined by Equation 2.

$$\theta_k = \begin{bmatrix} \theta_k \\ \dot{\theta}_k \end{bmatrix} \qquad \text{[Equation 2]}$$

Here, if a non-linear element, such as friction is not taken into account, the following Equation 3 may be approximately established by a simple law of motion.

$$\theta_k = \theta_{k-1} + \dot{\theta}_{k-1}\Delta t + a_k \frac{\Delta t^2}{2} \qquad \text{[Equation 3]}$$

$$\dot{\theta}_k = \dot{\theta}_{k-1} + a_k \Delta t$$

Here, taking the presence of an arbitrary angular velocity in a state without a user input into account, an equation of state may be expressed by the following Equation 4.

$$\theta_k = F_k\theta_{k-1} + w_k \quad \text{[Equation 4]}$$

Here, $$w_k = Ta_k,$$

$$F = \begin{bmatrix} 1 & \Delta t \\ 0 & 1 \end{bmatrix},$$

$$T = \begin{bmatrix} \frac{\Delta t^2}{2} \\ \Delta t \end{bmatrix}.$$

If it is assumed that an average angular velocity is 0 and a standard deviation of a normal distribution is $\sigma_a$, a covariance Q of $W_k$ may be $TT^T\sigma_a^2$. In such a manner, if it is assumed that the standard deviation of the normal distribution is $\sigma_a$, the following Equation 5 can be obtained.

$$z_k = H\theta + v_k \quad \text{[Equation 5]}$$

Here, H=[1 0], $R=\sigma_z^2$.

In such a manner, if state vectors of the Kalman filter 200 are defined, the original signal prediction module 220 may predict an original monopulse signal, which corresponds to a state prior to distortion of the monopulse signal, based on the state vectors defined. The update module 230 may continuously update the is prediction of the original monopulse signal, and after the update, apply the sensed gyro signal to a state variable, which corresponds to an angular velocity of the updated monopulse signal.

In detail, information related to an angular velocity and measured noise ($w_k$,$v_k$) may be input. Here, the corresponding variables have characteristics which vary according to a characteristic of a system, which may make it difficult to apply consistent values therefor. In order to repetitively execute the prediction of the original signal and the update, initial values of $x_{k-1|k-1}$, $F_k$, $P_{k-1|k-1}$ may be set. Also, the steps of the prediction of the original signal and the update thereof, which will be described in detail later, may be repeated until input data is not present.

First, in the prediction step, a state may be predicted as represented by Equation 6, and a covariance may be predicted as represented by Equation 7.

$$\check{x}_{k|k-1} = F_k\check{x}_{k-1|k-1} + B_ku_k \quad \text{[Equation 6]}$$

$$P_{k|k-1} = F_kP_{k-1|k-1}F_k^T + Q_{k-1} \quad \text{[Equation 7]}$$

Here, x denotes a state variable, namely, a matrix formed by an angle and an angular velocity in Equation 3. Also, k|k−1 denotes a state of a k point based on a value measured at a k−1 point.

Afterwards, in the update step, a deviation between the predicted value and the measured value may be calculated as represented by Equation 8. A Kalman gain of the Kalman filter 200 may be updated as represented by Equation 9, and a state correction and a covariance correction may be carried out as represented by Equations 10 and 11.

$$\tilde{y}_k = z_k - H_k\check{x}_{k|k-1} \quad \text{[Equation 8]}$$

$$K_k = P_{k|k-1}H_k^T(H_kP_{k|k-1}H_k^T + R_k)^{-1} \quad \text{[Equation 9]}$$

$$\check{x}_{k|k} = \check{x}_{k|k-1} + K_k\tilde{y}_k \quad \text{[Equation 10]}$$

$$P_{k|k} = (I - K_kH_k)P_{k|k-1} \quad \text{[Equation 11]}$$

Here, after updating the Kalman gain and the predicted value of the state variable using the monopulse measurement, a gyro signal rarely having to measurement noise may substitute for a monopulse angular velocity so as to be used for the update. That is, a signal measured by the gyro may be applied to the state variable, which corresponds to the angular velocity of the monopulse signal updated by the Kalman filter. Here, since the angular velocity state variable value is a value based on the monopulse signal, other than an actually measured angular velocity, it may be highly likely to predict an incorrect monopulse signal in the next prediction step. Hence, the gyro signal rarely having measurement noise and a signal delay can substitute for the state variable corresponding to the monopulse angular velocity, so as to be used for the update. This may allow for removing the measurement noise included in the monopulse signal and compensating for the time delay occurred upon calculation of the monopulse signal, resulting in obtaining a more accurate prediction of the original monopulse signal.

The predicted original monopulse signal may be input to the controller 300 through the output module 240 for the stabilization control.

Figure 5:
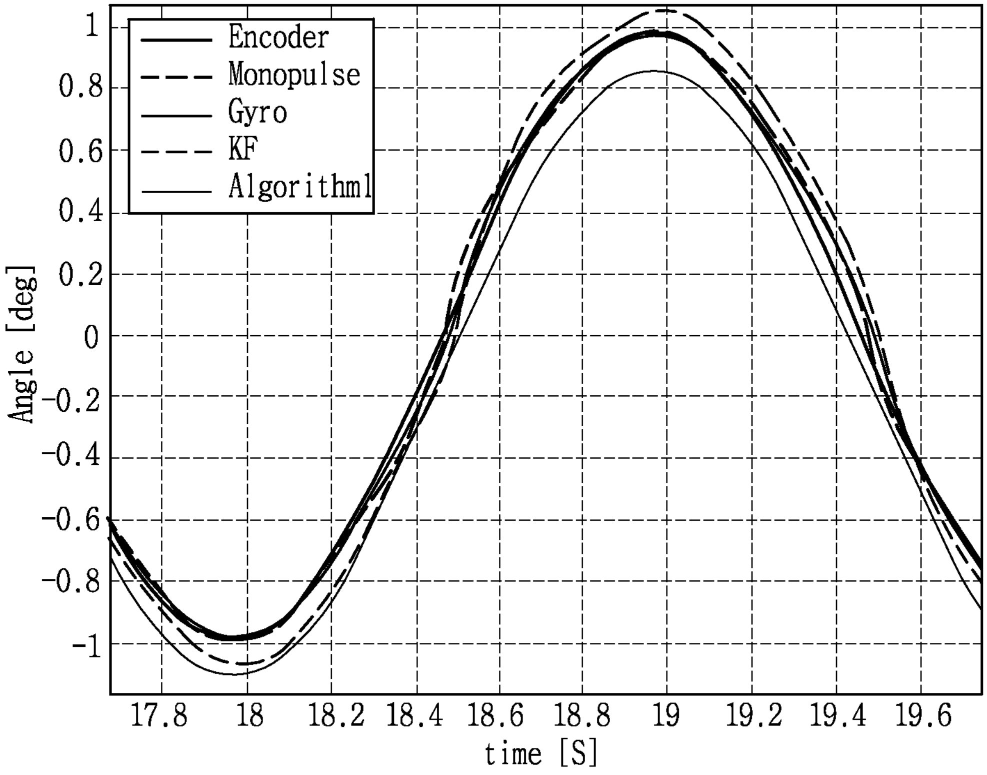
FIG. 5 is a graph illustrating a stabilization control performance of the satellite tracking antenna in accordance with the exemplary embodiment of the present disclosure.

Meanwhile, FIG. 5 is a graph illustrating a stabilization control performance of the satellite tracking antenna in accordance with the exemplary embodiment of the present disclosure. In FIG. 5, an encoder is an actually measured error, and how close to the encoder may be a criterion for determining the stabilization performance. As illustrated in FIG. 5, it can be seen that the monopulse signal includes much noise and also slightly includes a time delay and non-linearity. It can also be noticed that an error (deviation) of the integration of the gyro signal is increasing according to a lapse of time. Compared with applying a general Kalman filter, it can be seen that a less error is caused in the method using the gyro and the Kalman filter according to the exemplary embodiment disclosed herein.

As described above, the stabilization system for the satellite tracking antenna using the gyro and the Kalman filter according to the exemplary embodiment may be capable of more accurately predicting a monopulse signal prior to distortion, removing noise of the monopulse signal, and even partially compensating for a time delay caused upon generation of the monopulse signal.

Figure 9:
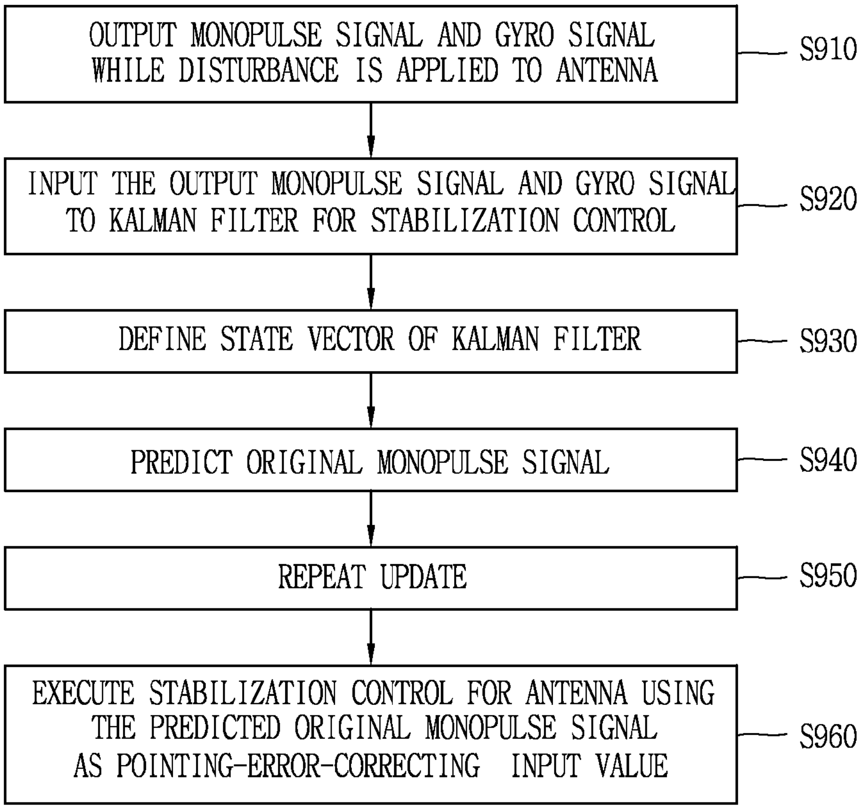
FIG. 9 is a flowchart exemplarily illustrating a stabilization control method for a satellite tracking antenna in accordance with an exemplary embodiment of the present disclosure.

FIG. 9 is a flowchart exemplarily illustrating a stabilization control method for a satellite tracking antenna in accordance with an exemplary embodiment of the present disclosure.

First, under a situation that disturbance is applied to a satellite tracking antenna having a gyro 50 (see FIG. 7), a monopulse signal and a gyro signal may be output through the satellite tracking antenna (S910).

For stabilization control of the satellite tracking antenna, the output monopulse signal and gyro signal may be input into a Kalman filter 200 (see FIG. 7). That is, the monopulse signal and the gyro signal may be input to the Kalman filter 200.

The Kalman filter 200 may then define a state vector thereof based on a pointing error angle for the satellite tracking, corresponding to the monopulse signal, and a pointing error angular velocity for the satellite tracking, corresponding to the gyro signal.

An original monopulse signal corresponding to a state prior to distortion of the monopulse signal may be predicted based on the defined state vector (S940).

The predicted value (or prediction) of the original monopulse signal may be continuously updated (S950). In detail, the updating step (S950) may be carried out to continuously update a Kalman gain of the Kalman filter 200 and the predicted value of the original monopulse signal by use of the monopulse signal measured through the satellite tracking antenna.

Here, after the updating step (S950), an angular velocity value of the gyro signal measured by the gyro 50 may be applied to an angular velocity value updated by the Kalman filter 200, to prevent a prediction of an incorrect monopulse signal in the next predicting step.

Afterwards, the predicted original monopulse signal may be input into the controller as a pointing-error-correcting command, thereby carrying out the stabilization control for the satellite tracking antenna.

As described above, according to a stabilization system for a satellite tracking antenna using a gyro and a Kalman filter, and a stabilization control method for the satellite tracking antenna according to exemplary embodiments disclosed herein, noise of a monopulse signal may be reduced and a time delay occurred upon generation of the monopulse signal may be partially compensated for by predicting an original monopulse signal prior to distortion. Also, a structure of a controller for the stabilization control of the satellite tracking antenna can be more simplified, and a calculation burden of the processor may be reduced accordingly.

The foregoing embodiments and advantages are merely exemplary and many alternatives, modifications, and variations will be apparent to those skilled in the art without departing from the scope of the present disclosure. Therefore, it should also be understood that the above-described embodiments should be to construed broadly within its scope as defined in the appended claims, and therefore all changes and modifications that fall within the metes and bounds of the claims, or equivalents of such metes and bounds are therefore intended to be embraced by the appended claims.

What is claimed is:

1. A stabilization control method for a satellite tracking antenna, the method comprising:

outputting a monopulse signal and a gyro signal through a satellite tracking antenna having a gyro mounted thereto, under a situation that disturbance is applied to the satellite tracking antenna;

inputting the output monopulse signal and gyro signal into a Kalman filter for stabilization of the satellite tracking antenna;

defining a state vector of the Kalman filter based on a pointing error angle for the satellite tracking, corresponding to the monopulse signal, and a pointing error angular velocity for the satellite tracking, corresponding to the gyro signal;

predicting an original monopulse signal corresponding to a state prior to distortion of the monopulse signal based on the defined state vector, and continuously updating the prediction of the original monopulse signal; and carrying out the stabilization control for the satellite tracking antenna by using the predicted original monopulse signal as a pointing-error-correcting input value.

2. The method of claim 1, further comprising, after the updating step:

applying an angular velocity value of the gyro signal, measured by the gyro equipped to rear end of satellite antenna reflector, to an angular velocity value updated by the Kalman filter.

3. The method of claim 2, wherein the updating step is executed to continuously update a Kalman gain of the Kalman filter and the prediction of the original monopulse signal, using the monopulse signal measured through the satellite tracking antenna.

4. The method of claim 1, wherein the predicting step and the updating step of the original monopulse signal are repetitively carried out until a data input into the Kalman filter is ended.

5. A stabilization system for a satellite tracking antenna, the system comprising:

a satellite tracking antenna;

a gyro module that is configured to sense a gyro signal for calculating an angular velocity for a satellite directed by the satellite tracking antenna, the gyro module being connected to a rear end of a reflector of the satellite tracking antenna;

a Kalman filter unit that is configured to calculate a prediction of an original monopulse signal, corresponding to a state prior to distortion of a monopulse signal output from the satellite tracking antenna, by using the monopulse signal and the sensed gyro signal as input signals; and a controller that is configured to carry out a stabilization control for the satellite tracking antenna by receiving the prediction of the original monopulse signal as a pointing-error-correcting value.

6. The system of claim 5, wherein the Kalman filter unit comprises:

a state vector definition module that is configured to define a state vector based on a pointing-error angle for the satellite tracking, corresponding to the monopulse signal, and a pointing-error angular velocity for the satellite tracking, corresponding to the sensed gyro signal;

an original signal prediction module that is configured to predict the original monopulse signal corresponding to the state prior to the distortion of the monopulse signal, based on the defined state vector;

an update module that is configured to continuously update the prediction of the original monopulse signal, and after the update, apply the sensed gyro signal to a state variable, corresponding to an angular velocity of the updated monopulse signal; and an output module that is configured to output the predicted original monopulse signal to the controller.

* * * * *